Sept. 7, 1943. O. STEINER 2,329,011
PHOTOGRAPHIC FLASH SYNCHRONIZATION EQUIPMENT
Filed July 19, 1940 7 Sheets-Sheet 1

INVENTOR.
Oscar Steiner
BY
Emery, Booth, Townsend, Miller and Neidner
his ATTORNEYS

Sept. 7, 1943.                O. STEINER                    2,329,011
               PHOTOGRAPHIC FLASH SYNCHRONIZATION EQUIPMENT
                    Filed July 19, 1940           7 Sheets-Sheet 2

INVENTOR.
Oscar Steiner
BY
his ATTORNEYS.

Sept. 7, 1943.　　　O. STEINER　　　2,329,011
PHOTOGRAPHIC FLASH SYNCHRONIZATION EQUIPMENT
Filed July 19, 1940　　　7 Sheets-Sheet 4

INVENTOR.
Oscar Steiner
BY
his ATTORNEYS

Sept. 7, 1943.     O. STEINER     2,329,011
PHOTOGRAPHIC FLASH SYNCHRONIZATION EQUIPMENT
Filed July 19, 1940     7 Sheets-Sheet 5

INVENTOR.
Oscar Steiner
BY
his ATTORNEYS.

Sept. 7, 1943.  O. STEINER  2,329,011
PHOTOGRAPHIC FLASH SYNCHRONIZATION EQUIPMENT
Filed July 19, 1940  7 Sheets-Sheet 6

INVENTOR.
Oscar Steiner
BY
his ATTORNEYS.

Sept. 7, 1943. O. STEINER 2,329,011
PHOTOGRAPHIC FLASH SYNCHRONIZATION EQUIPMENT
Filed July 19, 1940 7 Sheets-Sheet 7

INVENTOR.
Oscar Steiner
BY
his ATTORNEYS.

Patented Sept. 7, 1943

2,329,011

UNITED STATES PATENT OFFICE 2,329,011

PHOTOGRAPHIC FLASH SYNCHRONIZATION EQUIPMENT

Oscar Steiner, Rochester, N. Y., assignor to The Folmer Graflex Corporation, Rochester, N. Y., a corporation of Delaware Application July 19, 1940, Serial No. 346,395

12 Claims. (Cl. 67—29)

This invention relates to photographic flash synchronization equipment.

In order that the principle of the invention may be readily understood, I have disclosed a single embodiment, with several indicated uses thereof, in the accompanying drawings, wherein—

I am aware that there have been numerous devices produced for the purpose of synchronizing the flashing of a photo-flash lamp with the opening of a photographic shutter, but so far as I am aware they have all been very limited in their scope of operation, have been hard to adjust and the accuracy of such adjustment has been difficult to maintain.

I have by my invention provided a synchronizing equipment that is readily adaptable to all types of camera shutters, both the front or between-the-lens type and the focal-plane shutter type, and such equipment of my invention readily lends itself to precision manufacturing. The parts of the equipment as constructed in accordance with my invention are of great strength and they coordinate effectively in their several adjustments, whatever be the type of camera upon which they are used.

Among the numerous novel features of my invention, I may enumerate the following as of particular importance; a battery case readily mounted on or applied to a camera casing in a manner permitting ready adjustment, the battery case being readily adaptable to use either two or three cells of flash-light batteries, said battery case having a lamp readily useable as a voltage indicator to ascertain the condition of the batteries at any time, the battery case having means for clamping the same to the camera in an adjustable manner and having means for connecting the battery and lamp circuit to a focal-plane shutter with means for preventing inadvertent flashing of the flash lamp when so connected; means for mounting the reflector on the battery case so that it may be readily adjusted or detached;

a lens system built into the battery case and so positioned as to serve for aligning the reflector with the object to be photographed, this being particularly important with photo-flash lamps using reflectors that project a narrow beam of light; means providing for remote control of the flash synchronizer, such means preventing inadvertent flashing of the flash-lamp when the remote control is in use; means for rapidly ejecting a used photo-flash lamp immediately after having been flashed and still so hot it cannot readily be handled; and a magnetic tripping device allowing the maximum adjustment of time delay between the time of flashing the lamp and the operation of the shutter, means being provided for quickly disconnecting the magnetic tripper from the shutter operating or release lever when other than instantaneous exposures are to be made.

The foregoing and other features of my invention are fully set forth in the following description.

Making reference first to Figs. 1 to 3 and 5, the casing of the camera is indicated generally at 20. While the invention may be applied to any desired type of camera, I have chosen to illustrate the same as applied to the well known Graphic type of camera. The synchronizing equipment of my invention can, however, be applied to any type of camera having the usual between-the-lens shutter or the usual focal plane shutter or having both such shutters.

The camera is preferably provided with a detachable lens board 21 carrying a between-the-lens shutter 22 having a lens 23. Attached to the camera casing 20 is a battery-case bracket 24, shown detached in Fig. 13, and the ends whereof are attached to the camera casing by screw 24a, 24a, the shape of the said bracket 24 as herein shown being such that it extends sufficiently about the range finder 25 usually provided on such type of camera. A bracket of different construction may, of course, be used when the camera does not carry a range finder.

The battery case is indicated generally at 26 and is made up of two parts clamped or otherwise removably secured together and supported by a clamp member or ring 27, which is itself secured to the battery bracket 24 by a clamping lever 28. This portion of the structure will be more fully described at a subsequent point.

The battery case 26 is so constructed as to carry a flash lamp or bulb 29. A reflector 30 is also provided for the purpose of concentrating the light of the said flash bulb upon the object to be photographed.

Figures 1, 2, 3, 4:
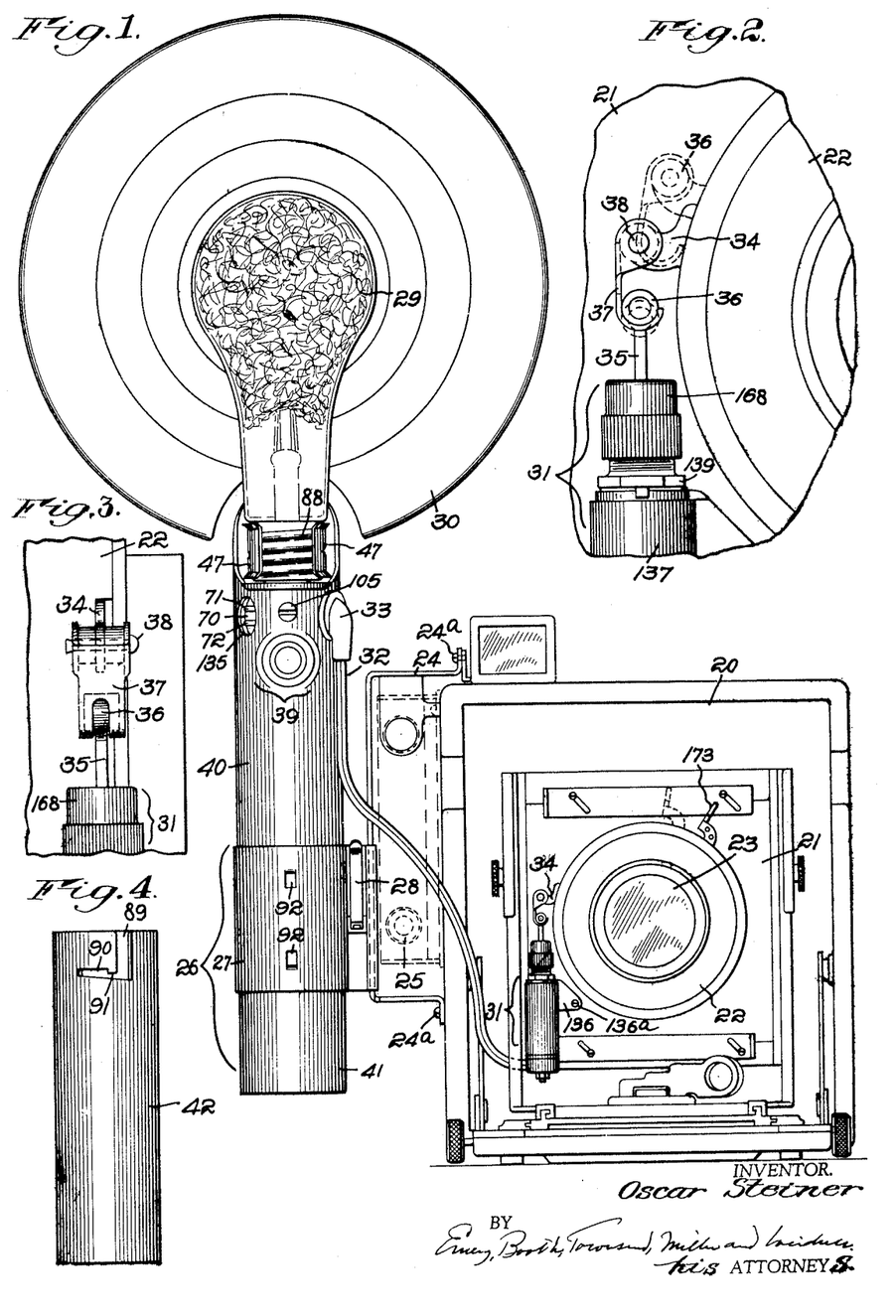
Fig. 1 is a front plan view of a camera having attached thereto a synchronizing equipment in accordance with my invention, the battery case being attached to the left hand side of the camera box and the magnetic tripper to the lens board of the camera.
Fig. 2 is an enlarged fragmentary detail in elevation of Fig. 1, showing the connecting clevis between the shutter operating lever and the magnetic-tripper connecting-arm.
Fig. 3 is a detail in side elevation of Fig. 2.
Fig. 4 is a detail of the battery case extending member employed when three cells are used in the battery case.
Figures 5, 24, 25:
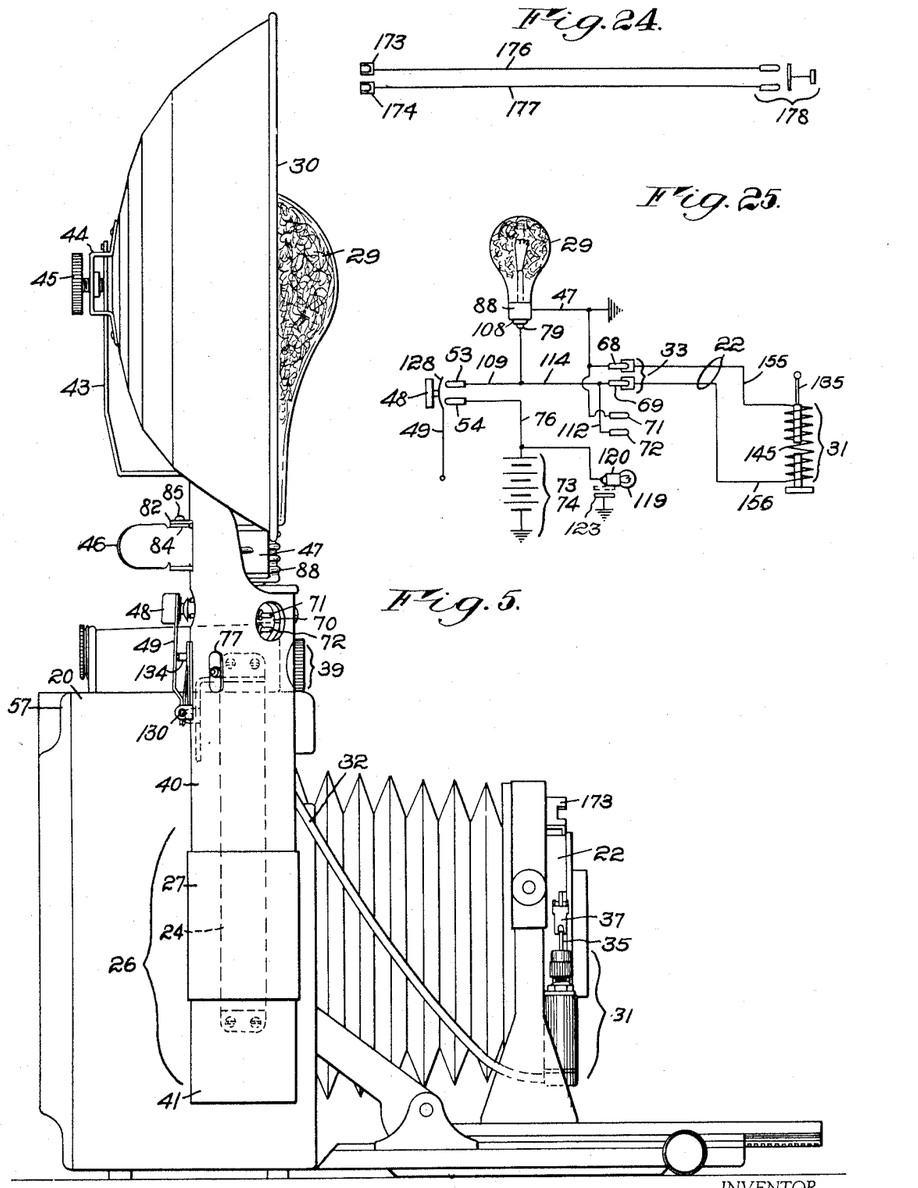
Fig. 5 is a side view of the camera and equipment showing the battery case on the camera box and the magnetic tripper on the lens board, the camera being open and a bulb in place ready for operation.
Fig. 24 is a diagram of the wiring as required for remote control.
Fig. 25 is a circuit diagram of the synchronizer equipment, showing the connection for the operation of the front shutter.
Figure 21:
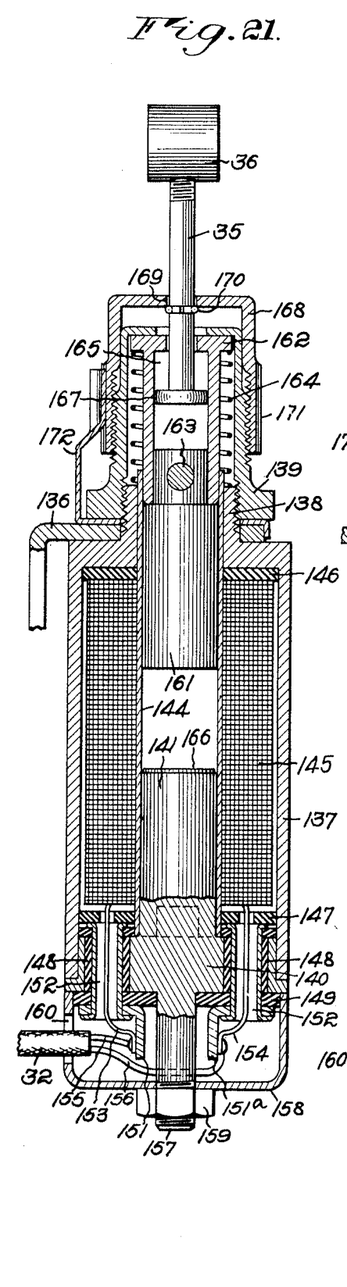
Fig. 21 is a vertical cross section through the magnetic tripper which is in non-operative position, the coil not having been energized.
Figures 22, 23:
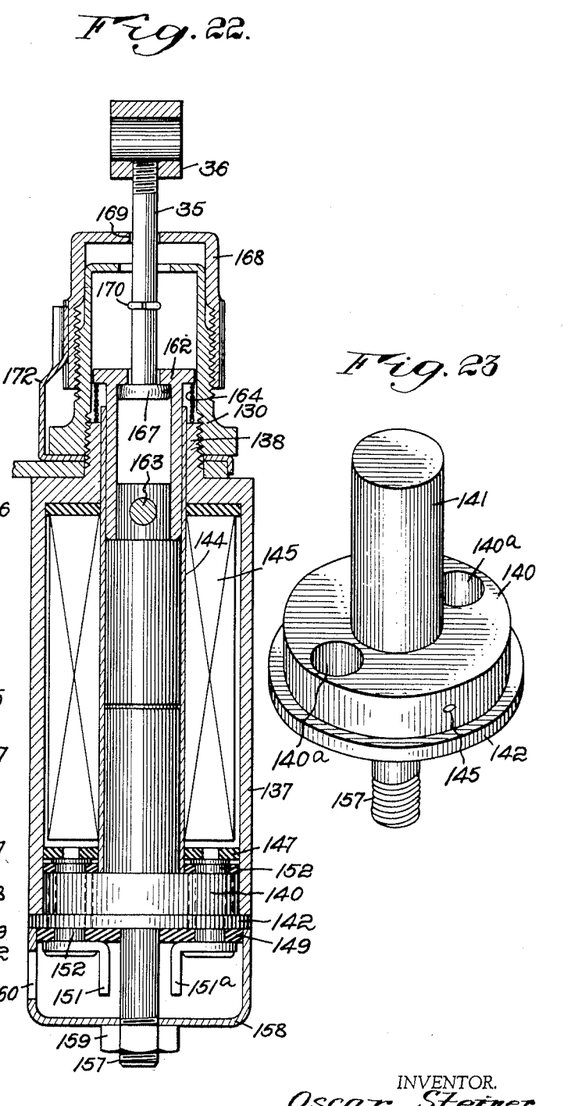
Fig. 22 is a view similar to Fig. 21, the coil having been energized and the armature having moved downward, carrying with it the shutter operating connecting link.
Fig. 23 is an enlarged, perspective detail of the base of the magnetic tripper.

I have indicated generally in Figs. 1 and 5 and in detail in Figs. 21 and 22 a magnetic tripper at 31, and constituting the preferred embodiment of electromagnetic operator. This is preferably attached to the lens board 21 by means of two or more screws 136a, one screw only being shown. The said magnetic tripper 31 is electrically connected to the battery case 26 by means of a cable 32 and a plug 33 shown in Fig. 1. An operating or release lever 34, which may be of usual construction and which is provided upon the shutter 22, is operated by a shaft or rod 35 provided with a connecting bar 36 for engaging a clevis 37 attached to the shutter operating or release lever 34 by means of a pin 38. The structure of the magnetic tripper will be described in detail at a subsequent point.

Returning to the structure of the battery case 26, shown in Figs. 1, 4, 7, 8 and 12 to 15 particularly, the case itself is made up of two preferably cylindrical sections 40, 41, the section 40 being the upper and the section 41 being the lower one. For ordinary use, I have provided two dry cells of some well known type of manufacture. At times, however, it is desirable to provide three such cells, and in order to do this I have provided an additional lower battery-case member or section 42, shown detached in Fig. 4, and which is of sufficient length to accommodate such additional battery cell. I may use together either the upper section 40 and the short lower detachable section 41, in which case there are only two dry cells, or I may use the upper section 40 and the longer lower section 42, in place of the shorter lower section 41, and in such case there is thus provided means for supporting three dry cells.

The camera having the synchronizer equipment attached thereto has, as shown in side elevation in Fig. 5, the reflector 30 supported by a reflector bracket 43 attached to the upper battery-case section 40, which serves to support said reflector in such position that it can be readily adjusted along (that is, lengthwise of) the said bracket 43. The reflector 30 is provided with a clamping bracket 44 and a clamp screw 45. When the latter is loosened the reflector 30 can be adjusted up and down along the bracket 43, and thus can be set in proper position with respect to the flash lamp 29 which is held to the battery case 26 by means of a clamping socket having operating arms 46, 46 and jaws 47, 47, fully disclosed at a subsequent point in the specification. An operating button 48 is provided for completing the circuit through the flash-lamp 29 and the magnetic tripper 31 when the front or between-the-lens shutter is provided. When, however, the synchronizer equipment is to be used in cooperation with the rear or focal-plane shutter, which use is shown in Fig. 6, I provide in conjunction therewith a structure which may be such as is disclosed in my Patent No. 2,188,065, dated January 23, 1940, and which therefore need not be more fully described here.

Figure 6:
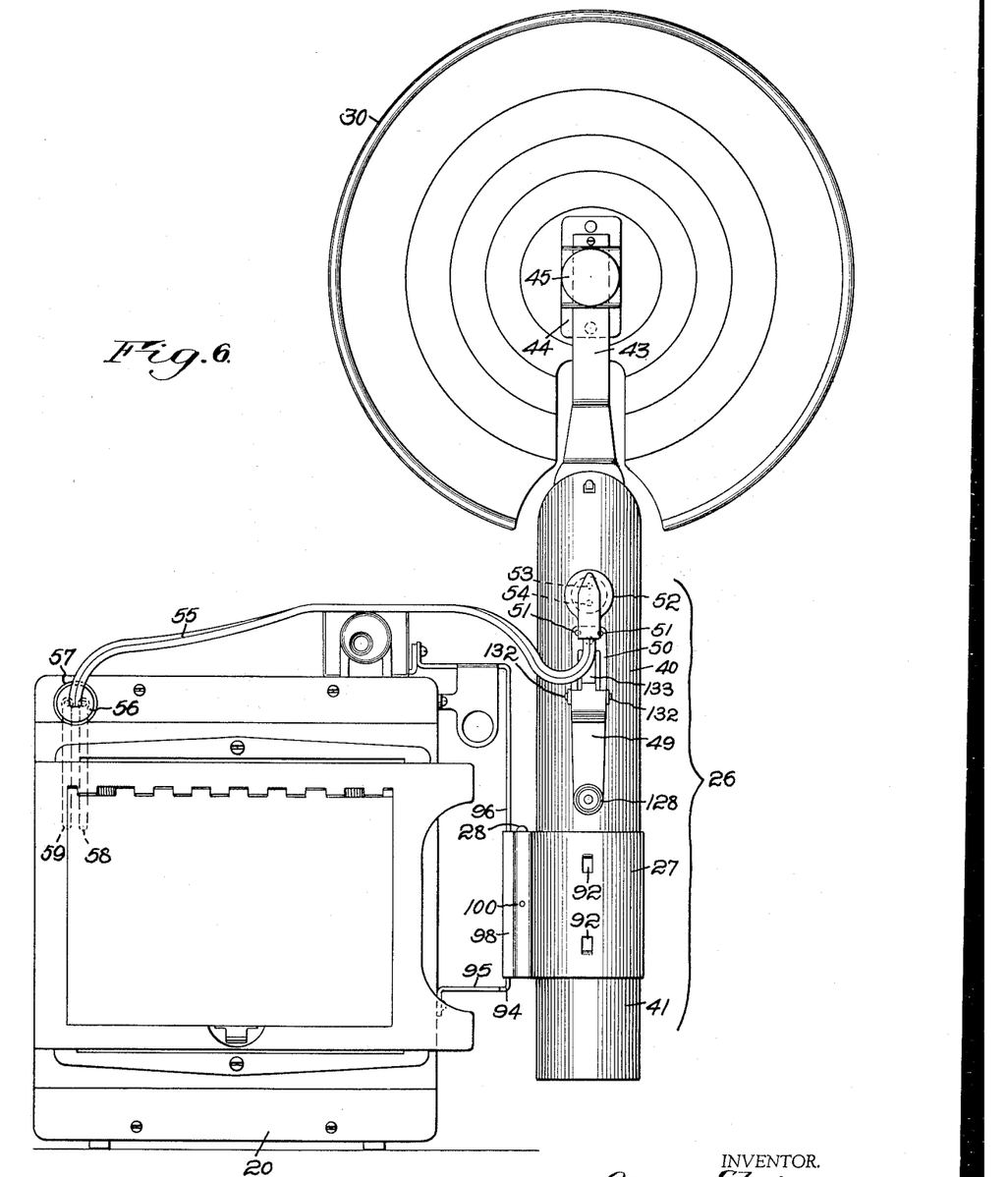
Fig. 6 is a rear view in elevation showing the position of the battery case with respect to the camera and the electrical connecting cable in place for focal plane synchronization.
Figures 16, 17, 18:
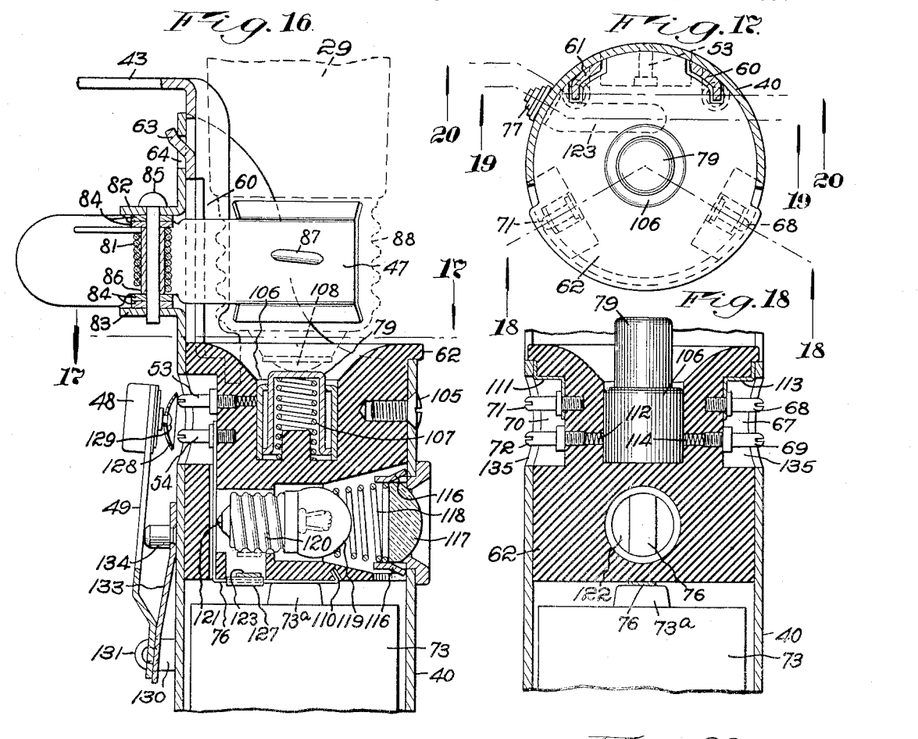
Fig. 16 is a vertical section through Fig. 8, showing the structure of the contacting members, together with the auxiliary lamp and its optical system.
Fig. 17 is a transverse section through Fig. 16 on the line 17—17 thereof.
Fig. 18 is a vertical section through Fig. 17 on the line 18—18 thereof.

In such use of my present invention, there is provided said operating button 48, indicated also in Figs. 5 and 16, which is carried by a flat spring member or arm 49 hinged to a bracket 50 attached to the upper battery-case section 40 by means of rivets 51, 51, the parts being so constructed that the spring member or arm 49 can be turned downward so that the connecting plug 52 (Fig. 6) can engage the contacts 53, 54, shown in dotted lines in Fig. 6. Said connecting plug 52 is provided with a cable 55 having a second connecting plug 56 engaging a socket 57 of the focal-plane shutter, itself provided with contact members 58, 59, shown in dotted lines in Fig. 6, and which may be of a character disclosed in said Patent No. 2,188,065.

Figures 7, 8:
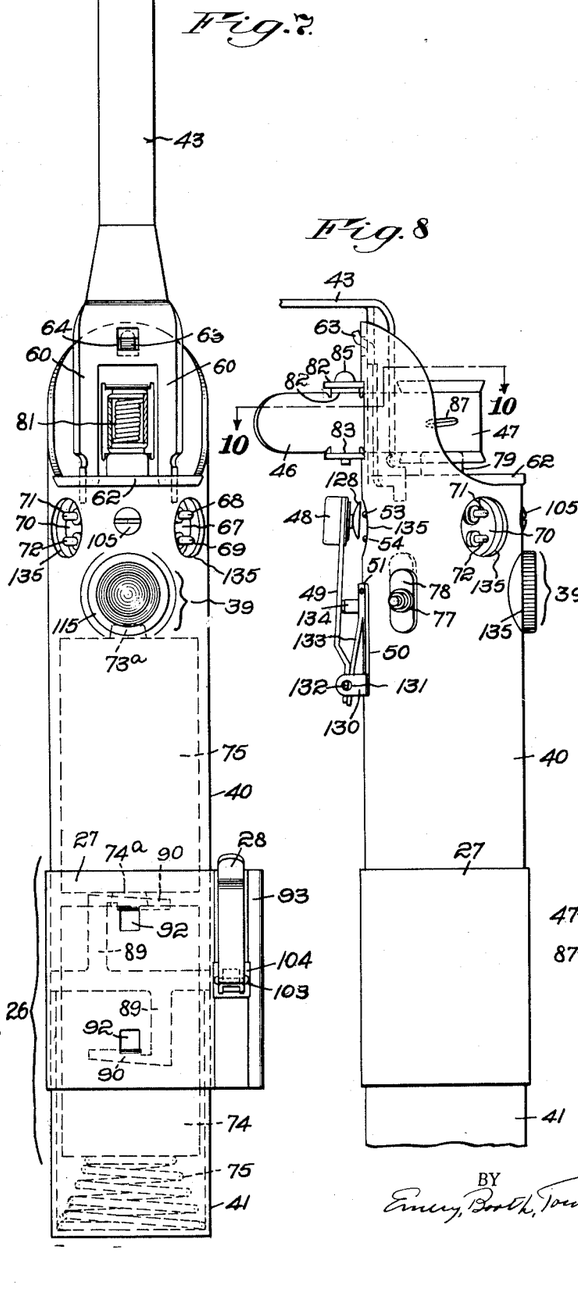
Fig. 7 is a front view in elevation of the battery case removed from the camera, showing the position of the reflector support bracket, the reflector being removed and the batteries being shown in dotted lines.
Fig. 8 is a side view in elevation, showing the battery case, the operating switch, and the spring socket for holding the photo-flash lamp.
Figure 20:
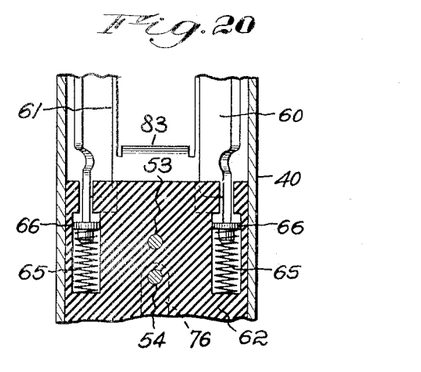
Fig. 20 is a vertical section through Fig. 17 on the line 20—20 thereof showing the retaining springs for the reflector bracket.

The battery case 26 (but with the reflector removed) is shown in Fig. 7, which indicates how the reflector bracket 43 is attached to the battery case. The said bracket 43 is provided with two legs 60, 61 extending through holes in the battery-case insulating block 62 as shown in Fig. 20. The said bracket 43 is provided with a hooked formation or member 63 which engages a hole 64 in the upper battery-case section 40. In the said insulating block 62 there are provided grooves for receiving small coiled springs 65, 65 engaging spring blocks 66, 66 for the purpose of causing upward pressure upon the said legs 60, 61. This structure is shown also in Fig. 7, and is indicated in dotted lines in Fig. 8. In order to remove the bracket 43, it is merely necessary to apply downward pressure on the bracket 43 which will compress the springs 65, 65 sufficiently to allow the hook-like part or member 63 to be disengaged from the hole 64, thus releasing the reflector bracket 43.

As indicated in Fig. 7, the connecting plug 33 has been removed from a socket 67 in the battery case, thereby exposing contact members 68 and 69. A second socket 70 is provided on the left hand side of the said battery case as the same is viewed in Fig. 7. Within said socket are contact members 71 and 72. In Fig. 7, the batteries 73, 74 are indicated in dotted lines. They have positive contact members 73a, 74a respectively, and the lower battery-case section 41 is provided with a spring 75 for maintaining a contact to or with the negative side of the battery cell, said spring also serving to apply upward pressure on the battery cells 73, 74, causing contact to take place between the positive connection 73a (shown in dotted lines in Fig. 7) and the positive contact member 76 (shown in Fig. 16).

An auxiliary lamp control button is indicated at 77 in Fig. 8, it desirably having an escutcheon plate 78. The said button provides for the control of the electric circuit extending to the auxiliary lamp or bulb 39, the function of the said lamp, the details thereof and its control being subsequently described.

Figure 9:
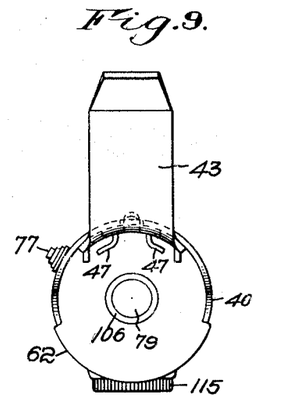
Fig. 9 is a top plan view of Fig. 8, showing the position of the reflector bracket, with the flash-bulb clamps broken away.
Figure 10:
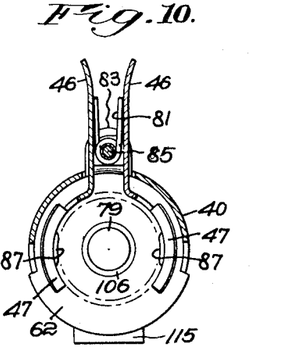
Fig. 10 is a top plan view, partially in section, of Fig. 8, showing the structure of the photo-flash lamp socket.

As indicated in Figs. 9 and 10, there is provided a central lamp contact at 79, the structure thereof being fully shown in Figs. 16 and 18. The said contact 79 has the additional important function of serving to eject the lamp bulb 29 from the clamping jaws 47, 47 through the action of the socket jaw fingers 46, 46. This action will be described at a subsequent point. However, the lamp bulb combined holding-and-used-bulb ejecting means herein disclosed is not claimed in this application either per se or in combination with any other features, but such means is claimed in my co-pending divisional application Ser. No. 493,098, filed July 1, 1943.

Figure 11:
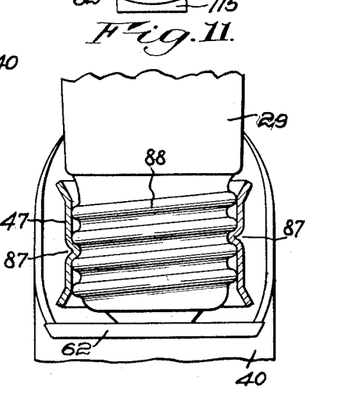
Fig. 11 is an enlarged vertical section through the photo-flash lamp socket, showing the structure of the two clamping members.

As most clearly shown in Figs. 8, 10 and 16, wherein the socket jaw fingers are shown in lengthwise section, there is provided a hinge pin and a clamp spring 81 and tow ears 82, 83 which are bent outwardly from the upper part of the battery-case section 40, forming a support for the socket jaw arms or clamp members 46, 46, which have bent-in members 84, 84 and said hinge pin indicated at 85 passes through a hole provided in said members 82, 83, 84, 84, thus providing a hinge for the said socket clamp members 46, 46. A suitable spacing sleeve 86 is provided for supporting the clamp spring 81. The clamping members 47, 47 are provided with indentations 87, 87 to engage the threaded portion 88 of the lamp base, as best shown in Fig. 11.

Figure 12:
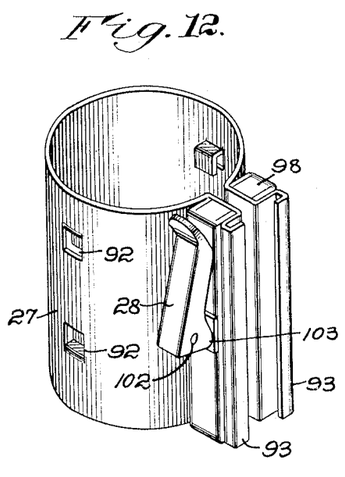
Fig. 12 is a detail in perspective, showing the battery case clamping means.
Figure 14:
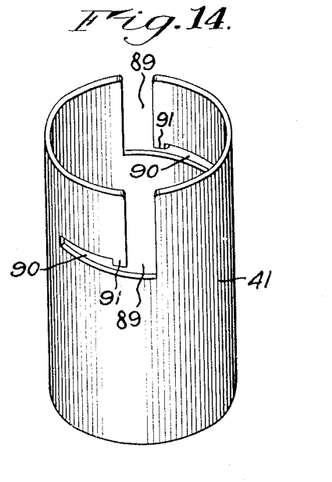
Fig. 14 is a detail in perspective of the lower part of the battery case, when two cells are used.

It has been stated that the battery case 26 is made up of the upper battery case section 40 and a lower section 41 or 42, depending upon whether two or three dry cells are to be used. Both the upper battery-case section 40 and the lower section 41 are provided as shown in Fig. 14, and as indicated in dotted lines in Fig. 7, with vertical or lengthwise slots 89, 89 and horizontal or transverse slots 90, 90. Each slot 90 is so shaped as to provide a projection 91 extending partly across the same. The battery-case clamp member or ring 27 is provided, as shown in Fig. 12, with hook-engaging formations 92, 92 to engage said slots 90, 90. When the upper battery-case section 40 is engaged by the clamp member or ring 27 by the guiding hook formations 92 in the vertical slots 89, 89 of the upper battery-case section 40 and lower section 41 (or 42) the hook formations 92 are caused to engage the slots 90. This is effected by holding the upper battery-case section 40 in one hand and turning the lower battery-case section 41 (or 42) with the other hand in a clockwise direction, pressure being at the same time applied with such hand in an upward direction on the lower battery-case section 41 (or 42) and with the hand that holds the battery-case section 40 applying downward pressure thereon. This permits the hook formations 92 to pass the respective projections 91 and engage the slots 90. The battery-case sections 40 and 41 (or 42) tend to spread under the influence of the coil spring 75 that (as shown) presses against the bottom of the battery-case section 41 and against battery 73, battery 74, contact 74a, contact 73 and positive contact strip 76. This pressure will prevent the hook formations 92 from being disengaged from the slots 90 through any action of the projecting lugs 91 of Figs. 4 and 14.

Figure 13:
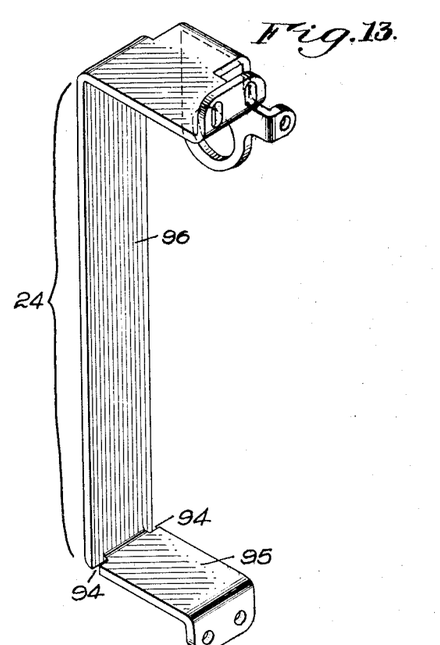
Fig. 13 is a detail in perspective showing the synchronizer battery case mounting bracket.

It will be noted that the said slots 90 are somewhat longer than the width of the hook formations 92. This provides for a lateral (that is, circumferential) adjustment of the upper battery-case section 40 with respect to the clamping member or ring 27 for the purpose of aligning the reflector 30 so as properly to direct the light upon the object being photographed. The said clamping member or ring 27 is provided with channel formations 93, 93 for engaging the battery-case supporting bracket 24, as shown in Fig. 13. The said bracket 24 is, as there shown, provided with notches 94, 94 at the junction of the horizontal arm 95 and the vertical member 96 of said bracket. This construction permits the channel formations 93 to engage the vertically positioned member 96 in such a manner that it can be moved along the vertical member 96 and clamped in any desired position thereon.

Figure 15:
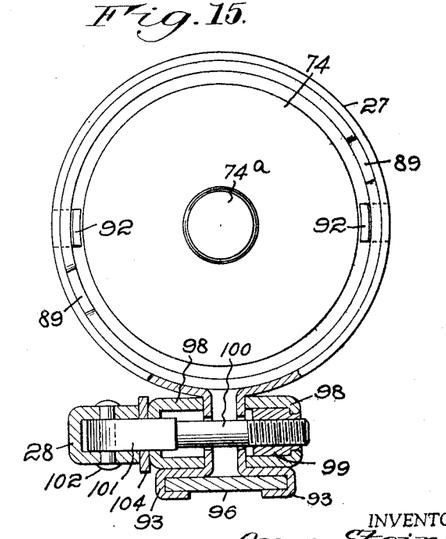
Fig. 15 is a top plan view of the lower half of the battery case removed from the upper half, the clamping means being in section.

The clamping member or ring 27 is provided with clamping blocks 98, 98, most clearly shown in Figs. 12 and 15. The right hand clamping block 98, viewing Fig. 15, is provided with a nut 99 engaged by the threaded end of clamping rod 100, provided with a square end 101 having a hinge pin 102 passing through such square end and the clamping lever 28. The latter is provided with a cam shaped formation 103 riding on a plate 104 when the clamping lever 28 is in the position shown in Fig. 12. This causes pressure to be applied to the clamping blocks 98, 98 and to the channel formations 93, 93, thus permitting clamping member or ring 27 to be clamped to the vertical member 96 of the bracket 24, best shown in Fig. 13. Any degree of clamping action can be secured by adjusting the threaded end of the clamping rod 100 in the nut 99 of the right hand clamping block 98 shown in Fig. 15. When the clamping lever 28 is in the position shown in Fig. 12, the upper battery-case section 40 and the lower section 41 will also be clamped in rigid position. When the clamping lever 28 is released, the entire battery case 26 can be moved vertically on the said upright member 96 of the bracket 24, and said entire battery case 26 can also be adjusted in a horizontal direction or circumferentially, so as properly to align the reflector 30 and the flash-lamp 29 so as to project the light from the flashlamp onto the object to be photographed.

The internal construction of the upper part of the upper battery-case section 40 is clearly shown in the cross sectional views Figs. 16 to 20. Therein is shown a molded insulating cylindrical member 62 of suitable material fitted into the battery-case section 40 and held in place by a screw 105. Such molded block 62 carries a contact 79 previously preliminarily referred to and which is fitted into a cylindrical sleeve 106 having a cupped-in end provided with a hole for the necessary lengthwise movement of said contact member 79, the lower end of which is outwardly flanged as shown in Fig. 16. Said molded member 62 has a small central projecting cylindrical formation over which is fitted a spring 107 that causes said contact member 79 to be pushed upward so as to engage with the contact 108 of the flash lamp 29. The co-acting end flanges on the sleeve 106 and the contact 79 prevent the spring 107 from pushing said contact member 79 beyond a certain limit. Said spring 107 is of sufficient strength to eject the flash-lamp 29 from the socket jaws 47, 47, when they are released by the application of pressure on the socket jaw arms or clamp member 46, 46, best shown in Figs. 5, 8, 10 and 16.

The connector 53 is threaded into the molded block 62 against the pressure of a spring which makes contact with sleeve 106. The contact member 54 is also threaded into the block 62 and through a hole (not shown) provided in the positive contact strip 76, as shown in Fig. 16, the lower end of which strip has a turned-over end 110 anchored into contact block 62. The contact member 71 is, as shown in Fig. 18, threaded into the molded block 62 and through a hole in a contact strip 111, thus connecting the said contact member 71 with the upper battery-case section 40. The contact member 72 is threaded into the said block 62 and causes a spring 112 seated in the socket at the inner end thereof to ensure contact between the contact member 72 and the sleeve 106. As shown in Fig. 18, the contact member 68 is threaded into the said block 62 and through the connector strip 113, which also makes contact with the upper battery-case section 40, thus completing a circuit between such section 40 and the connector member 68. The contact member 69 is threaded into the said block 62 against the pressure of a coiled spring 114 similar to the spring 112, so that contact is made with the sleeve 106, thus completing the circuit between said sleeve 106 and the contact member 69.

An auxiliary lamp is indicated generally at 39 in Figs. 1, 5, etc. It is shown in detail in Fig. 16 as including a short sleeve or cylindrical member 115 fitted into an opening in the upper battery-case section 40, being held in such position by projecting lugs 116, 116. Said upper section 40 has a cylindrical hole with key-way openings permitting the passage of lugs 116, 116, whereupon said sleeve 115 is given a slight turn so that said lugs engage the wall of the said upper section 40, thus holding the sleeve 115 in place. Fitted into said sleeve is a lens 117 held in place by means of a spring 118 pressing against the bulb 119 of the auxiliary lamp 39 that is provided with the usual base 120. The said lens 117, spring 118, bulb 119 and base 120 are received in a cavity molded into the insulating block 62, so as properly to fit therein and be held in proper alignment. The bulb 119 is provded with a base contact 121 making contact with the positive connecting strip 76, shown also in Fig. 18, in the lamp clearance hole 122.

The bulb 119 (auxiliary lamp 39) has a further important function in that it serves as means of checking the condition of the batteries 73 and 74. This is done by merely operating the switch button 77 and noting the color of the light filament. If the color is close to white, the batteries are satisfactory, but as the filament approaches a yellow color, the batteries are weak and should not be used.

The auxiliary lamp 39 not only is used in locating the object to be photographed, but it is used for adjusting the position or angle of the reflector 30, so that the reflector will throw the light in the proper direction for making the desired photograph.

Figure 19:
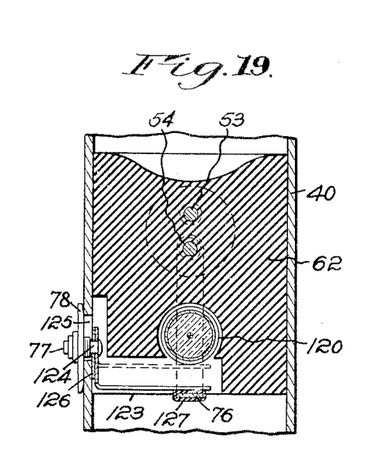
Fig. 19 is a vertical section through Fig. 17 on the line 19—19 thereof, showing the contacting means of the auxiliary lamp.

As shown in Figs. 5, 8 and 19, the auxiliary lamp button 77 has attached thereto a spring contact member 123 by means of a shoulder rivet 124 which slides in a slot 125 in the upper battery-case section 40.

As shown in Fig. 19, the contact finger 123 is electrically connected to the upper battery-case section 40 by means of a friction washer 126, and to prevent the short-circuiting of the contact finger 123 and the positive connector strip 76, there is provided an insulating sleeve 127 placed about said strip. In order to light the auxiliary lamp bulb 119, the button 77 is pushed upwardly, carrying with it the contact spring 123 which will be caused to contact with the lamp base 120, as shown in dotted lines in Fig. 16. This action is indicated in Fig. 19. Since the lamp contact 121 is in contact with the positive battery terminal 73a, shown in Figs. 16 and 17, current will flow through the auxiliary lamp bulb 119 back to the lamp base 120 through the contact finger 123, then to the upper battery-case section 40, and finally through the battery spring 75 contacting with the negative side of the battery 74, thus completing the electric circuit to the said auxiliary lamp bulb 119. This lamp circuit constitutes auxiliary circuiting means that is independent from the photo-flash lamp circuit and can be used at any time.

In order to complete the circuit through the photo-flash lamp 29 and the batteries to the operating button 48, shown in Fig. 16, etc., which is insulated from the arm 49, there is attached a contact disk 128 by means of a rivet 129. As therein indicated and also as indicated in the circuit diagram Fig. 25, when button 48 is pressed, contact is made between contact member 53, disk 128 and connecting member 54, thus completing a circuit through the lamp contact 79, contact sleeve 106, spring 109, connector member 53, contact disk 128, connector member 54, and positive contact strip 76 to the battery contact 73a of the battery 73, and then through said battery to the contact 74a of battery 74, then through said battery to spring 75, to battery-case sections 41 and 40, through battery socket members 47, flash-lamp base 88 and lamp contact 108, thus completing a circuit through the photo-flash lamp 29 and the batteries.

The employment of a separate or independent circuit control for the auxiliary lamp is of great importance, said lamp being used for several different purposes, namely, (1) for locating and illuminating the object to be photographed, (2) for the proper positioning of the reflector which includes positioning the entire battery case so that the illumination will fall on the object being photographed. This is very important now that small bulbs are being used and, more efficiently to use them, reflectors having a rather narrow angle of projection must be used. Heretofore reflectors were used that did little more than to project the light forward and sideways with no thought being given to narrowing down the beam, thus to obtain more light upon the object being photographed. In such previous uses the reflector could be considerably out of adjustment and still have fairly satisfactory illumination, but with the new reflectors the beam from the flash lamp is confined to an area just slightly greater than the area taken in by the photographic lens, and it becomes necessary accurately to position this beam of light. (3) The use of the auxiliary lamp for checking battery condition is very important because it is necessary for the photographer to know that he has batteries that are in a satisfactory working condition when he starts out to make photographs. This is more important when using trippers of less efficiency than my tripper. However, it is still important when a tripper of as high efficiency as my tripper is used.

As shown best in Figs. 6, 8 and 16, the switch arm 49 and switch base 50, previously described as attached to the battery-case section 40, are respectively provided with two upturned ears 130 extending from the base 50 and having holes 131, 131, and members 132, 132 on the switch arm 49, thereby providing a pivot for said switch arm. Also formed integral with the base plate 50 is a spring member 133 bearing against a flat portion of the switch arm 49 and tending to cause said switch arm to rock on the pivot formed by the members 132, 132 until contact with a stud 134 stops further movement of said switch arm 49. The construction and operation are such that the contact disk 128 does not normally touch connector members 53 and 54, but a slight pressure on the contact button 48 causes the switch arm 49 to spring sufficiently to cause the said disk 128 to contact with the said connector members 53 and 54.

The said switch arm 49 is so constructed that it can be swung downward away from the connector members 53 and 54, so that the focal-plane shutter connector 52 can be attached to the said connectors 53 and 54, thus putting the focal-plane shutter contacts 58, 59 in series with the photo-flash lamp 29, and if contact is made between said contacts 58, 59 a circuit will be completed through contact plug 56, wire 55, connector 52 and contacts 53, 54, thus causing the flash lamp 29 to be ignited. When the magnetic tripper 31 is in use, the switch arm 49 overlies the contacts 53 and 54, thus preventing anyone from connecting any auxiliary device to those contacts, which, if done, would cause the flash-lamp 29 to be flashed inadvertently. To permit the use of additional flash-lamps remote from the battery case, there are provided the two additional sets of connectors 68, 69, 71, 72, which are in parallel with the photo-flash lamp base by means previously described.

As shown in Figs. 16, 17 and 18, the connector members 53, 54, 68, 69, 71 and 72 are accessible through holes 135 in the upper battery-case section 40. A lamp can be placed in the lamp socket jaws 47, 47, and additional lamp sockets can be connected to the contacts 68, 69, 71, 72, and upon the completion of a circuit through the connectors 53, 54, all three lamps will be caused to be ignited simultaneously.

If, however, a magnetic tripper is connected to either set of connectors 68, 69 or 71, 72, the magnetic tripper will also be in parallel with the photo-flash lamp 29. I have provided a magnetic tripper to be used with the equipment, thereby making it possible to make photo-flash exposures by any one of the three well-known methods, the first of which is the so-called "open and shut" method, wherein the camera shutter is set at "bulb" exposure, and the shutter is caused to be opened at the same time that contact button 48 is pressed, whereupon the shutter is immediately allowed to close. In this method, however, the exposure time is limited by the duration of the photo-flash lamp. The second method of photo-flash synchronization is carried out by the use of the focal-plane shutter, as disclosed in my Patent 2,188,065 above referred to, and in such use the button 48 and switch arm 49 are swung downward out of the way, the focal-plane shutter being connected through connectors 53 and 54. The third method of photo-flash synchronization is carried out through the use of an electro-magnetic tripper for operating the front shutter. My improved means for operating the front or between-the-lens shutter will now be described, and in doing so reference will be made particularly to Figs. 21, 22, 23, and briefly to Fig. 1. The electro-magnetic tripper is shown in vertical cross section in Figs. 21 and 22. This structure has been developed through a long period of experimentation and research and it operates more effectively than any magnetic tripper with which I am familiar.

As shown in Fig. 1, the said tripper is mounted on the lens board 21, being carried by a bracket 136 secured to said lens board by screws 136a. While this is its preferable location, I am not limited thereto. A portion of the said bracket 136 is shown also in Fig. 21. Upon such bracket is mounted a cylindrical casing 137 having a threaded neck 138 passing through a hole in said bracket and held thereto by a cylindrical cap 139. To the lower end of said cylinder is attached a metal base 140 having an upwardly extending cylindrical member 141 constituting a stationary armature, and a stop or projection 142 so as properly to position the base in said cylinder 137. Said base 140 is held in the cylinder 137 by means of a locking screw (not shown) engaging a threaded hole. Over the cylindrical member or armature 141 is fitted a non-magnetic tube 144 preferably of brass and around said tube is wound a coil 145 of insulated magnetic wire. On the upper end of the coil 145 is placed an insulating washer 146, and on the lower end an insulating washer 147. The said base 140 is provided with two holes 140a, 140a shown in Fig. 23, through which pass two insulating bushings 148, 148. On the lower side of the base 140 is another insulating washer 149 and on the top face of said base are placed two small insulating washers, and passing therethrough and through the tube 148, washer 149, and wire lug 151, is a metal eyelet 152 spun over on each end, thus holding the assembly to the base 140. Passing through a hole in the insulating bushing 147 in the metal eyelet 152 are two leads 153, 154 of the coil 145. The lead 153 is attached to lug 151 and the lead 154 is attached to lug 151a. The connecting cable 32 is made up of wires 155, 156. This constitutes the preferred means for connecting the coil 145 with the cable 32. The base 140 has a downwardly extending member 157 threaded on the lower end, and fitted over the said member 157 is a wire shield or guard 158 held in place by a nut 159. A hole 160 is provided in the shield 158 for the passage of the cable 32. Fitted into the upper portion of the tube 144 is a movable magnetic armature or solenoid plunger 161 having attached thereto a sleeve 162 by means of a rivet 163. About said sleeve 162 is a coiled spring 164 tending to thrust the said sleeve and the armature or solenoid plunger 161 upward until the limit of motion is reached at the cylindrical cap 139. Riding in a space 165 of the sleeve 162 is a disk 167 attached to the shutter tripping shaft or rod 35 in any well known manner, said shaft or rod 35 and the disk 167 being entirely free to move within the space 165 provided in the sleeve 162.

When an electrical circuit is completed through the coil 145, the movable armature or solenoid plunger 161 will be drawn downward toward the stationary armature 141 until it contacts with a non-magnetic plate 166 placed on the stationary armature 141 to prevent sticking of the movable armature or solenoid plunger 161 to the said stationary armature. The shaft or rod 35 will not commence to move immediately, nor until the partially closed end of the sleeve 162 contacts with the disk 167, at which time the shaft or rod 35 will travel with the armature or solenoid plunger 161 until it reaches its limit of action.

In order to adjust the length of space between the disk 167 and the partly closed end of the sleeve 162, so that the initial stroke of the movable armature or solenoid plunger 161 can be varied, there is provided an adjusting sleeve 168 having a circular hole 169 for the passage of said shaft or rod 35. In a groove in said shaft or rod 35 is placed a cylindrical ring 170 engaged by the top wall of the adjusting sleeve 168, when the said shaft or rod 35 is moved in an upward direction under the influence of the shutter actuating arm 34, shown in Figs. 1 and 2. It will be apparent that, because of the presence of the ring 170, by turning the adjusting sleeve 168 in a clockwise direction, said shaft or rod 35 will be moved downward, and the length of the space 165 between the closed end of sleeve 162 and the disk 167 will become greater, because the threads provided on the sleeves 139 and 168 are cut in a right hand direction, thus allowing the armature or solenoid plunger 161 to travel a greater distance before the rod or shaft 35 begins to move downward. If, however, the adjusting sleeve 168 is turned in a contraclockwise direction, the length of the space between the partially closed end of the sleeve 162 and the disk 167 will become less, thus allowing the armature or solenoid plunger 161 to travel a shorter distance before the shaft or rod 35 commences to move. In order to hold the adjusting sleeve 168 in any predetermined position, there is provided a series of serrations or notches 171 on the outer wall of the adjusting sleeve 168, which are engaged by a spring 172 held to the magnetic tripper assembly by the cylindrical nut 139.

In Fig. 24 is shown a circuit diagram for use in remote control, by which I mean the operation of the flash synchronizer from a distance. This is done by connecting suitable plugs 173, 174, shown in Fig. 24, to connectors 53, 54, shown in Figs. 3 and 16 and by attaching a wire 176 to the connector plug 173 and attaching a wire 177 to the connector plug 174, said wires 176, 177 being connected to a suitable switch 178. When the switch 178 is operated, a circuit is completed through the connectors 53, 54 in precisely the same manner as if the button 48 had been pressed.

The circuit diagram of the flash synchronizer equipment when the magnetic tripper is used on a front or between-the-lens shutter is shown in Fig. 25, from which it appears that the batteries 73 and 74 are connected in series and then to ground, the ground in this instance being the battery case 26 made up, as stated, of the upper section 40 and lower section 41 or 42. To the positive terminal 73a of the battery 73 is connected the strip 76 which is connected to the contact or connector 54. The auxiliary lamp bulb 119 has contact with one side of the positive connector 76, and the base 120 of said lamp bulb 119 has contact with the contact strip 123, as shown in dotted lines in Fig. 25. Connected to the plug 53 is the center contact 79 which makes contact with the lower lamp contact 108. The current then passes through the filament of the flash lamp 29, through the base 87 to the ground (namely, the battery case 26). The connectors 68 and 71 are also connected to ground and the connector plug 69 is connected to plug 53, connector plug 72 being connected to the plugs 69 and 53. When the magnetic tripper is used, the plug 68 is connected to wire 155 and the current passes through coil 145 to wire 156 and then to connector plug 69. The coil 145, flash lamp 29, and plugs 71, 72 are in parallel, and the plugs 53, 54 are in series with flash lamp 29 and the battery, made up of the cells 73 and 74 in the present instance.

I will now trace through the various combinations of circuits in the operation of the photoflash equipment herein set forth, according to each of the several uses of such synchronizer equipment.

It will first be assumed that it is desired to make a so-called "open and shut" photo-flash, meaning, as already stated, that the camera shutter is set on the "bulb" position and is in that position when the operating or shutter release lever 34 is pressed, the shutter being open and remaining open until the said lever 34 is pressed.

In making this type of exposure the battery case is placed on the camera as shown in Figs. 1 and 5. The plug 33 and the cable 32 are not in place, and there is no magnetic tripper attached to the shutter, it having been removed from the lens board, it being removably mounted therein by means of the bracket 136. A flash lamp 29 is placed in the socket jaws 47, 47 and the auxiliary lamp contact 77 is pushed upwardly, thereby causing a beam of light to be projected in the direction of the object to be photographed. The clamp 28 is thrown downward and the battery case 26 is turned sufficiently in the member or ring 27 until the light from the auxiliary lamp 39 falls upon the object it is desired to photograph. The clamping lever 28 is then moved into the position shown in Fig. 1.

Assuming that the reflector 30 has been suitably adjusted in a vertical direction with respect to the flash lamp 29 so that the latter will center in the reflector, the most economical use of the light from said flash lamp is made in taking the photograph. After the suitable adjustment has been made, the contact button 79 is moved downwardly, thus extinguishing the auxiliary lamp-bulb 119, and the operator then aligns his camera in any well known manner such as through the optical view finder. The shutter release or operating lever 34 is then depressed and at the same time the contact button 48 is pressed inwardly and then immediately both buttons are released. The pressure on the shutter release or operating lever 34 will have opened the shutter, and the pressure on the contact knob 48 will have caused the flash lamp 29 to become illuminated and the release of pressure on said release or operating lever 34 will have allowed the shutter to close. No further pressure will be required on the contact knob 48 since when the flash lamp 29 is ignited its circuit is opened.

When making a flash exposure with the use of the focal-plane shutter, the contact lever 49 is folded downwardly as indicated in Fig. 6, and the connector plug 52 is connected to contacts 53 and 54. The said plug 52 is attached to a cable 55 having on its opposite end a plug 56 engaged with the focal plane synchronizing socket 57 connected with the contacts 58 and 59 of the camera back. The flash lamp 29 is inserted in the socket members or jaws 47, 47 and the bulb 119 of the auxiliary lamp 39 is illuminated by manipulation of the switch 77 and the reflector 30 is properly aligned from the object to be photographed. The front shutter is set on "time" in the open condition and the back shutter is ready to make an exposure upon releasing the focal-plane-shutter release lever (not here shown). The structure of such focal-plane shutter and the synchronizing mechanism therefore are fully disclosed in my said Patent 2,188,065. When the shutter is released, the curtain travels downwardly and at a predetermined point, the contacts 58 and 59 are bridged or connected together by a metallic tab or element on the shutter curtain.

Referring to Fig. 25, inasmuch as the connector 53 is connected with the contact 58, and the connector 54 is connected with the contact finger 59, a circuit will have been closed between them, thus allowing current to flow from the batteries 73, 74, through the positive contact strip 76, connector 54, cable 55, contacts 58 and 59, connector 53, to the lamp contact button 79, lamp contact 108, through the filament of the flash lamp 29, to the base of the auxiliary lamp 39, to the socket members 47, to ground, and from ground to the opposite side of the battery, thus completing the circuit through the photo-flash lamp 29 and causing it to become ignited.

When it is desired to make a photo-flash exposure using the front or between-the-lens shutter, a flash-lamp 29 is inserted in the socket jaws 47, 47, and the connector plug 33 is connected to socket 67, thus connecting the magnetic tripper 31 to the electrical circuit of battery case 26. The said battery case is positioned in the manner previously described, so as to ensure the most efficient use of the light from the flash-lamp 29. The focal-plane shutter is set in the "open" position. The between-the-lens shutter is set for whatever speed it is desired to use. The shutter is then cocked by moving the lever 173 from the position shown in dotted lines in Fig. 1 to the position shown in solid lines therein, the release or operating lever 34 having been previously connected to the magnetic tripper 31 by means of the clevis 37, bar 36 and shaft 35, as previously described.

The release or operating lever 34 will now be in the position shown in Fig. 2, depressed part way but not sufficiently far to trip the shutter. The contact bar 49 and the button 48 will be in the position shown in Fig. 5, and pressure on the button 48 will close the contacts 53 and 54. Current will then flow from batteries 73, 74 through positive contact strip 76, connector 54, contact disk 128, connector 53, contact spring 109, connector button 79, contact 108 through the filament of flash-lamp 29, to base 88 and socket jaws 47, 47 and thence to ground, completing the circuit through the flash lamp 29. The connector 68 is also connected to ground and connector 69 is connected to spring 114, which contacts with the sleeve 106 of the connector button 79. Inasmuch as the connector button 79 has its circuit as previously described, current will also flow through the magnetic tripper winding 145 and through cable 32, which is made up of wires 155, 156. The shaft or rod 35 of magnetic tripper 31 will be caused to move downwardly in the manner previously described through its connection with the movable armature or solenoid plunger 161. The release or operating lever 34 will then be moved downward as indicated by the dotted line position of the connecting bar 36 in Fig. 2, thus releasing the shutter, flashing the lamp 29 and causing an exposure to be made.

It will be understood from the foregoing description that I have provided a photo-flash synchronizing equipment having a great many advantages and improvements over existing synchronizer equipments known to me. Attention is particularly directed to the construction of the magnetic tripper 31 which is such that the movable armature or solenoid plunger 161 is in a free state at the instant of making an exposure; that is, the said armature or solenoid plunger has only to overcome the action of spring 164, which has just sufficient strength to hold the said armature or solenoid plunger in the all-the-way-up position. The said armature or solenoid plunger starts downward when a circuit is completed through the coil 145, and it gains considerable momentum before the shaft or rod 35 has started to move under the influence of disk 167, then the inertia of armature or solenoid plunger 161 is added to the magnetic pull, thus causing the shutter to be operated with a coil winding of relatively high resistance. Since the photo-flash lamp 29 and the magnetic tripper 31 are in parallel at the instant of exposure and since the voltage of flashlight batteries used in synchronizer equipments drops very rapidly as a load of low resistance is connected across them, it is highly important to have a magnetic tripper that will work with very low drain on the battery, so that there will be very little voltage-drop across the filament of the flash-lamp.

It will be apparent that the lower the voltage drop at the instant of making an exposure, the more accurate will be the timing of both the magnetic tripper and the flashing of the filament of the flash-lamp. A magnetic tripper as herein disclosed effects exceedingly economical use of the battery current. This has been proven through long testing of the herein disclosed equipment, by a number of operators.

In a test of this equipment a hundred photo-flash pictures were made, the same batteries being used throughout the entire test, and the timing of the flash and the magnetic tripper operating the shutter was still as accurate at the end of such test as at the commencement thereof. Inasmuch as these pictures were all made in rapid sequence, this was a much more severe test than would ordinarily take place, since usually pictures are taken with longer intervals between consecutive pictures, thus allowing the batteries to recuperate.

Having thus described one embodiment, with several indicated uses, of the invention, it is to be understood that although specific terms are employed, they are used in a generic and de- scriptive sense and not for purposes of limitation, the scope of the invention being set forth in the following claims.

I claim:

1. In a photographic flash synchronizer equipment for use with a camera having a casing, and having either or both a between-the-lens shutter and a focal-plane shutter, a battery case having battery means and having means to support a flash-lamp; means for attaching said battery case to the camera casing; circuiting means operatively connecting the battery to the flash-lamp; said battery case having a part provided with a pair of contacts, and a movably mounted contact-making member adapted to be moved out of operating relation to said pair of contacts so as to permit the latter to be connected to another circuit closing means, said movable contact-making member cooperating with said pair of contacts to close the flash lamp circuit, and simultaneously close the circuit to the between-the-lens shutter operator, said movably mounted contact member being adapted to be moved out of the way so that circuit wires from a switch operated simultaneously with the focal plane shutter may be connected to said pair of contacts, whereby the flash lamp circuit is closed by such latter switch, said movably mounted contact-making member normally overlying said pair of contacts so as to be readily moved into engagement therewith.

2. In a photographic flash synchronizer equipment for use with a camera having a casing, and having either or both a between-the-lens shutter and a focal-plane shutter, a battery case having battery means and having means to support a flash-lamp; means for attaching said battery case to the camera casing; circuiting means operatively connecting the battery to the flash-lamp; said battery case having a part 40 provided with an insulating block 62 having contacts 53, 54 therein and connected with said circuiting means, and a switch arm 49 having means for completing a circuit through said contacts 53, 54, said switch arm 49 being pivotally mounted so that it may be swung away from the said contacts 53, 54 to permit them to be connected to a focal-plane shutter synchronizing structure, said switch arm 49 cooperating with said pair of contacts 53, 54 to close the flash lamp circuit and simultaneously close the circuit to the between-the-lens shutter operator, said switch arm 49 being adapted to be swung out of the way so that circuit wires from a switch operated simultaneously with the focal plane shutter may be connected to said pair of contacts 53, 54, whereby when the flash lamp circuit is closed by said latter switch, said switch arm 49 normally overlies said pair of contacts 53, 54, so as to be readily moved into engagement therewith.

3. In a photographic flash synchronizer equipment for use with a camera having a casing, and having either or both a between-the-lens shutter and a focal-plane shutter, a battery case having battery means and having means to support a flash-lamp; means for attaching said battery case to the camera casing; circuiting means operatively connecting the battery to the flash lamp; said battery case including a part 40 having a block 62 provided with means to receive a photo-flash-lamp-bulb and having contacts 53, 54 adapted to be placed in circuit with said photoflash bulb, and a switch arm 49 having means for completing a circuit through the contacts 53, 54 mounted to be moved away from said contacts 53, 54 to permit them to be connected to another circuit closing means, said switch arm 49 cooperating with said pair of contacts 53, 54 to close the flash lamp circuit and simultaneously close the circuit to the between-the-lens shutter operator, said switch arm 49 being adapted to be moved out of the way, so that circuit wires from a switch operated simultaneously with the focal plane shutter may be connected to said pair of contacts 53, 54, whereby when the flash lamp circuit is closed by such latter switch, said switch arm 49 normally overlies said pair of contacts 53, 54 so as to be readily moved into engagement therewith.

4. In a photographic flash synchronizer equipment for use with a camera having a casing and having a shutter; a battery case having battery means and having a clamping socket at its upper end to support a flash lamp; means for attaching said battery case to the camera casing; circuiting means operatively connecting the battery to the flash lamp and having therein an electromagnetic operator through which said shutter may be operated; said battery case including an upper part 40 having an insulating block positioned therein at its upper end above the said battery, and an auxiliary lamp mounted directly in said insulating block below said clamping socket within the casing, and circuit means connecting said auxiliary lamp to the battery means independently of said flash lamp and shutter, and thereby permitting use of said auxiliary lamp through said battery means without thereby using the flash lamp or said shutter, the said battery case being so supported on the camera casing as to be itself circumferentially adjustable, and a reflector supported by said battery case, whereby said auxiliary lamp may be used for the proper positioning of the reflector and the battery case, so that the illumination will correctly fall on the object to be photographed.

5. In a photographic flash synchronizer equipment for use with a camera having a casing and having a shutter; a battery case having battery means and having a clamping socket at its upper end to support a flash lamp; means for attaching said battery case to the camera casing; circuiting means operatively connecting the battery to the flash lamp and having therein an electromagnetic operator through which said shutter may be operated; said battery case including an upper part 40 having an insulating block positioned therein at its upper end above the said battery, and an auxiliary lamp mounted directly in said insulating block below said clamping socket within the casing, and circuit means connecting said auxiliary lamp to the battery means independently of said flash lamp and shutter, and thereby permitting use of said auxiliary lamp through said battery means without thereby using the flash lamp or said shutter, the said battery case being so supported on the camera casing as to be adjustable in a direction axially of the battery case and so as to be circumferentially adjustable, and a reflector supported by the battery case, whereby the said auxiliary lamp may be used for the proper positioning of the reflector and the battery case with the illumination correctly falling on the object to be photographed.

6. In a photographic flash synchronizer equipment for use with a camera having a casing and having a shutter; a battery case having battery means and having a clamping socket at its upper end to support a flash lamp; means for attaching said battery case to the camera casing; circuiting means operatively connecting the battery to the flash lamp and having therein an electromagnetic operator through which said shutter may be operated; said battery case including an upper part 40 having an insulating block positioned therein at its upper end above the said battery, and an auxiliary lamp mounted directly in said insulating block below said clamping socket within the casing, and circuit means connecting said auxiliary lamp to the battery means independently of said flash lamp and shutter, and thereby permitting use of said auxiliary lamp through said battery means without thereby using the flash lamp or said shutter, the said battery case being so supported on the camera case as to be adjustable in an axial direction and also circumferentially, and a reflector supported by the battery case, whereby the auxiliary lamp may be used for the proper positioning of the reflector and the battery case.

7. A photographic flash synchronizer equipment according to claim 1, but in which the said battery case is also provided with pairs of contacts 68, 69 and 71, 72 respectively for additional flash lamps remote from the battery case.

8. A photographic flash synchronizer equipment according to claim 1, but in which the battery case is provided with additinal pairs of contacts 68, 69, and 71, 72, and there is also provided a magnetic tripper for the between-the-lens shutter adapted to be connected either to the pair of contacts 68, 69 or 71, 72.

9. In a photographic flash synchronizer equipment for use with a camera having a casing and having both a between-the-lens shutter and a focal plane shutter:—a battery case having battery means and having means to support a flashlamp; means for attaching said battery case with said flashlamp to the camera casing; circuiting means operatively connecting the battery means to the flashlamp, and including a magnetic tripper detachably connected to said between-the-lens shutter and also including focal plane shutter synchronizing means; said battery case having an insulating block mounted thereing at the upper end thereof above said battery means, said insulating block being provided with at least two sockets each having a pair of contacts connected to the circuiting means, whereby a plug may be inserted in one of said sockets and be electrically connected up to the said focal-plane-shutter synchronizing means, and whereby another plug may be inserted in the second socket and be electrically connected up to the said magnetic tripper that is detachably connected to the between-the-lens shutter; said insulating block also having an auxiliary lamp mounted transversely of the block in a cavity therein so as to be directed in parallelism with the axis of the objective lens of the camera toward the object to be photographed; and auxiliary circuiting means connecting said auxiliary lamp to the said battery means independently of that part of the first-mentioned circuiting means that includes the flashlamp and the magnetic tripper and synchronizing means for said shutters respectively, so as thereby to permit the use by said auxiliary circuiting means of said auxiliary lamp through said battery means without thereby flashing the flashlamp when in its socket and without thereby using either of said shutters.

10. A photographic flash synchronizer equipment according to claim 9, but wherein adjacent one of said sockets there is movably mounted a contact-making member adapted to be readily moved out of operating relation to the pair of contacts at said socket so as to permit the latter to be connected to one of the said plugs for closing the flashlamp circuit and synchronizing one of said shutters, said contact-making member being adapted when in operating relation to be pressed to engage the pair of contacts at said socket, thereby to close the flashlamp circuit and to synchronize one of said shutters.

11. In a photographic flash synchronizer equipment for use with a camera having a casing and having a shutter; a battery case having battery means and having a clamping socket at its upper end to support a flashlamp; means for attaching said battery case to the camera casing, and including means permitting lengthwise and turning adjustment of said battery case with respect to said camera casing; circuiting means operatively connecting the battery to the flashlamp and having therein an electromagnetic operator through which said shutter may be operated; said battery case including an upper part 40 having an insulating block positioned therein at its upper end above the said battery, and an auxiliary lamp mounted directly in said insulating block below said clamping socket within the casing, and circuit means connecting said auxiliary lamp to the battery means independently of said flashlamp and shutter, and thereby permitting use of said auxiliary lamp through said battery means without thereby using the flashlamp or said shutter, the said battery case being so supported on the camera casing as to be itself circumferentially adjustable, and a reflector supported by said battery case, whereby the said auxiliary lamp may be used for the proper positioning of the reflector and the battery case, so that the illumination will correctly fall on the object to be photographed.

12. In a photographic flash synchronizer equipment for use with a camera having a casing and having a shutter; a battery case having battery means and having a clamping socket at its upper end to support a flashlamp; means for attaching said battery case to the camera casing, circuiting means operatively connecting the battery to the flashlamp and having therein an electromagnetic operator through which said shutter may be operated; said battery case including an upper part 40 having an insulating block positioned therein at its upper end above the said battery and provided with a plurality of pairs of contacts connected to the circuiting means, and an auxiliary lamp mounted directly in said insulating block below said clamping socket within the casing, and circuit means connecting said auxiliary lamp to the battery means independently of said flashlamp and shutter, and thereby permitting use of said auxiliary lamp through said battery means without thereby using the flashlamp or said shutter, the said battery case being so supported on the camera casing as to be itself circumferentially adjustable, and a reflector supported by the said battery case, whereby the said auxiliary lamp may be used for the proper positioning of the reflector and of the battery case, so that the illumination will correctly fall on the object to be photographed.

OSCAR STEINER.